US012803335B2

(12) United States Patent
Cao et al.

(10) Patent No.: US 12,803,335 B2
(45) Date of Patent: Nov. 17, 2026

(54) WIRELESS CHARGING TRANSMITTER AND METHOD OF OPERATING THE SAME

(71) Applicant: NXP B.V., Eindhoven (NL)

(72) Inventors: Wei Cao, Suzhou (CN); Dengyu Jiang, Suzhou (CN); Huan Mao, Suzhou (CN); Xiang Gao, Shanghai (CN)

(73) Assignee: NXP B.V., Eindhoven (NL)

( * ) Notice: Subject to any disclaimer, the term of this patent is extended or adjusted under 35 U.S.C. 154(b) by 763 days.

(21) Appl. No.: 18/328,904

(22) Filed: Jun. 5, 2023

(65) Prior Publication Data

US 2024/0006920 A1 Jan. 4, 2024

(30) Foreign Application Priority Data

Jun. 30, 2022 (CN) ......................... 202210776283.3

(51) Int. Cl.
*H01M 10/44* (2006.01)
*H01M 10/46* (2006.01)
*H02J 50/12* (2016.01)
*H02J 50/60* (2016.01)

(52) U.S. Cl.
CPC .............. *H02J 50/12* (2016.02); *H02J 50/60* (2016.02)

(58) Field of Classification Search
CPC ............ H02J 50/12; H02J 50/60; H02J 5/005; H02M 7/4818
USPC ................................. 320/108, 109, 128, 140
See application file for complete search history.

(56) References Cited

U.S. PATENT DOCUMENTS 5,420,518 A 5/1995 Schafer, Jr.
6,471,106 B1 10/2002 Reining
8,983,374 B2 3/2015 Wiley
9,178,387 B2 11/2015 Mohammadian et al.
9,316,674 B2 4/2016 Baldischweiler et al.
9,450,648 B2 9/2016 Bastami
9,465,064 B2 10/2016 Roy et al.
9,474,031 B1 10/2016 Sedzin et al.
9,530,558 B2 12/2016 Nakano et al.
9,806,542 B2 10/2017 Asanuma et al.
9,851,399 B2 12/2017 Finkenzeller et al.
(Continued)

FOREIGN PATENT DOCUMENTS

CN 102598521 A 7/2012
CN 103852631 A 6/2014
(Continued)

*Primary Examiner* — Edward Tso

(57) ABSTRACT

A wireless charging transmitter, controller and system are disclosed. The transmitter has a full-bridge inverter having two full-bridge output nodes, a resonant circuit comprising a series arrangement of a transmitter inductor and a first capacitor, and a second capacitor in parallel with the series arrangement, a PI-filter coupled between the second capacitor and the full-bridge inverter; wherein the controller is configured to measure a Q-factor of the resonant circuit by: controlling the full-bridge inverter to connect an input voltage supply to the PI-filter to supply an excitation pulse to the resonant circuit; controlling the full-bridge inverter to disconnect the input voltage supply and initiate a resonance in the resonant circuit; controlling a switch in the full-bridge inverter to provide an reference ground to a first terminal of the transmitter inductor; and measuring a decay of the voltage at a second terminal of the transmitter inductor.

13 Claims, 7 Drawing Sheets

(56) References Cited

U.S. PATENT DOCUMENTS

| | | | |
|---|---|---|---|
| 9,966,803 | B2 | 5/2018 | Wang et al. |
| 10,218,211 | B2 | 2/2019 | Li et al. |
| 10,283,995 | B2 | 5/2019 | Gunderson |
| 10,763,706 | B2 | 9/2020 | Chen et al. |
| 2003/0141845 | A1 | 7/2003 | Krieger et al. |
| 2004/0189215 | A1 | 9/2004 | Chen |
| 2008/0197804 | A1 | 8/2008 | Onishi et al. |
| 2009/0021219 | A1 | 1/2009 | Yoda et al. |
| 2013/0069441 | A1 | 3/2013 | Verghese et al. |
| 2013/0094598 | A1 | 4/2013 | Bastami |
| 2013/0154557 | A1 | 6/2013 | Lee et al. |
| 2013/0257165 | A1 | 10/2013 | Singh |
| 2013/0257168 | A1 | 10/2013 | Singh |
| 2014/0001879 | A1 | 1/2014 | Van Wageningen |
| 2014/0015329 | A1 | 1/2014 | Widmer et al. |
| 2014/0015522 | A1 | 1/2014 | Widmer et al. |
| 2014/0049422 | A1 | 2/2014 | Von Novak et al. |
| 2014/0084857 | A1 | 3/2014 | Liu et al. |
| 2014/0111019 | A1 | 4/2014 | Roy et al. |
| 2014/0125287 | A1 | 5/2014 | Nakano et al. |
| 2014/0239735 | A1 | 8/2014 | Abe et al. |
| 2014/0247004 | A1 | 9/2014 | Kari et al. |
| 2014/0319924 | A1 | 10/2014 | Jung |
| 2014/0333145 | A1 | 11/2014 | Lee et al. |
| 2014/0361738 | A1 | 12/2014 | Lee et al. |
| 2015/0162779 | A1 | 6/2015 | Lee et al. |
| 2015/0198640 | A1 | 7/2015 | Lee |
| 2015/0318708 | A1 | 11/2015 | Bartlett |
| 2015/0318730 | A1 | 11/2015 | Bhargava et al. |
| 2015/0326031 | A1 | 11/2015 | Yamaguchi et al. |
| 2015/0372493 | A1 | 12/2015 | Sankar |
| 2016/0028248 | A1 | 1/2016 | Asanuma et al. |
| 2016/0134131 | A1 | 5/2016 | Murayama |
| 2016/0146886 | A1 | 5/2016 | Finkenzeller et al. |
| 2016/0181871 | A1 | 6/2016 | Krumme et al. |
| 2016/0190852 | A1 | 6/2016 | Chiang et al. |
| 2016/0268842 | A1 | 9/2016 | Wang et al. |
| 2016/0336809 | A1 | 11/2016 | Gluzman et al. |
| 2017/0117755 | A1 | 4/2017 | Muratov et al. |
| 2017/0223637 | A1 | 8/2017 | Wang et al. |
| 2018/0048162 | A1 | 2/2018 | Von Novak et al. |
| 2018/0062504 | A1 | 3/2018 | Mei et al. |
| 2018/0115197 | A1 | 4/2018 | Li et al. |
| 2018/0241257 | A1* | 8/2018 | Muratov ................. H02J 50/12 |
| 2018/0304755 | A1 | 10/2018 | Beaver et al. |
| 2019/0217726 | A1 | 7/2019 | Covic et al. |
| 2019/0272943 | A1 | 9/2019 | Leem |
| 2020/0076246 | A1 | 3/2020 | Fukuzawa et al. |
| 2020/0212713 | A1 | 7/2020 | Jiang et al. |
| 2021/0175728 | A1 | 6/2021 | Wang et al. |
| 2022/0069627 | A1 | 3/2022 | Cimaz et al. |
| 2022/0069631 | A1* | 3/2022 | Choi ....................... H02J 50/80 |

FOREIGN PATENT DOCUMENTS

| | | | | | |
|---|---|---|---|---|---|
| CN | 102823101 | A | | 6/2015 | |
| CN | 105075066 | A | | 11/2015 | |
| CN | 205027804 | U | | 2/2016 | |
| CN | 103053093 | A | | 9/2017 | |
| CN | 210469153 | U | * | 5/2020 | |
| CN | 111313569 | A | | 6/2020 | |
| DE | 2443069 | A1 | | 3/1975 | |
| JP | 2015233410 | A | | 12/2015 | |
| TW | 200919901 | A | | 5/2009 | |
| WO | WO-2022041589 | A1 | * | 3/2022 | .......... H02M 3/3353 |

* cited by examiner

WIRELESS CHARGING TRANSMITTER AND METHOD OF OPERATING THE SAME

CROSS-REFERENCE TO RELATED APPLICATIONS

This application claims the priority under 35 U.S.C. § 119 of China application no. 202210776283.3, filed on 30 Jun. 2022, the contents of which are incorporated by reference herein.

FIELD

The present disclosure relates to wireless charging systems and in particular to wireless charging transmitters, controllers therefor and methods of operating such controllers and transmitters.

BACKGROUND

Wireless charging systems and solutions are becoming increasingly important in several fields of application, including consumer and automotive products. Wireless charging efficiency and safety can be significantly affected or compromised by the presence of foreign objects in the vicinity of the transmitter and/or receiving coil. It is important to be able to effectively identify situations in which a foreign object is or may be present. It is known to use resonance methods to identify a foreign object which may affect the charging, since the resonance of the transmitter is typically affected by any foreign object which would also affect the charging performance (for instance by changing the resonant frequency and/or level of coupling between the transmitter and receiver).

Resonance methods are generally straightforward to employ in wireless charging systems in which the resonance tank including the transmitter inductor coil and a series capacitor is directly coupled to a driving circuit such as a full-bridge inverter, since the series L-C resonance tank can readily be made to resonate. However, some wireless charging systems benefit by including a filter between the series L-C resonance tank and the driving circuit. It may be desirable to be able to employ resonance methods with transmitters including such filters without using lossy measurement circuits.

SUMMARY

According to a first aspect of the present disclosure, there is provided a controller for: a wireless charging transmitter circuit having a full-bridge inverter having first and second full-bridge output nodes, a resonance circuit comprising a series arrangement of a transmitter inductor and a first capacitor, and a second capacitor in parallel with the series arrangement, the wireless charging transmitter circuit further including a PI-filter comprising the second capacitor and first and second filter inductors coupled between first and second terminals of the second capacitor and the first and second full-bridge output nodes respectively; wherein the controller is configured to or operable to measure a Q-factor of the resonant circuit by: controlling the full-bridge inverter to connect an input voltage supply to the PI-filter to supply an excitation] pulse to the resonant circuit; controlling the full-bridge inverter to disconnect the input voltage supply and initiate a resonance in the resonant circuit; controlling a switch in the full-bridge inverter to provide a reference ground to a first terminal of the transmitter inductor; and measuring a decay of the voltage across the transmitter inductor. By connecting only one of the legs of the PI-filter to a fixed voltage, the transmitter inductor may be allowed to freely resonate only with the series capacitor Cser, and parallel capacitor Cpar. The inductors in the PI-filter have been effectively disconnected from the circuit, allowing for a "clean" free resonance which does not suffer from distortion due to the PI-filter, and may allow for voltage-based measurements.

According to one or more embodiments, measuring a decay of the voltage across the transmitter inductor comprises measuring a decay of the voltage at the second terminal of the transmitter inductor. In other embodiments, a differential measurement may be made. Measuring a decay of the voltage at the second terminal of the transmitter inductor may comprise measuring a first voltage at a central node of a resistive voltage divider coupled between a ground and a supply rail, the central node being coupled to the second terminal of the transmitter inductor by a first coupling capacitor in series with a first coupling resistor.

According to one or more embodiments, the controller is further configured to or operable to determine a power-loss during wireless charging. The measurement circuitry for measuring the resonance signal(s) may also be used in the power-loss measurements. In particular, the current in the transmitter coil (that is to say, the current in the transmitter inductor Lp) may be determined. Furthermore, measurement of the coil current may be used for additional, or alternative, purposes such as protection of the coil by avoiding overcurrent in the coil.

According to one or more embodiments, determining a power-loss during wireless charging comprises measuring a second voltage at a central node of a second resistive voltage divider coupled between the ground and the supply rail, the central node being coupled to the first terminal of the first capacitor by a second coupling capacitor in series with a second coupling resistor. According to one or more such embodiments, determining a power-loss during wireless charging comprises measuring a differential voltage between the first voltage and the second voltage. The single of differential voltage signals may enable demodulation of any residual communication information which may still reside in the resonance signal.

According to one or more embodiments, determining a power-loss during wireless charging comprises determining a current through the transmitter inductor from the differential voltage between the first voltage and the second voltage. Coil current so determined may be used in system protection, and additionally or alternatively, may be used to calculate the internal power-loss of the wireless charging transmitter.

According to a second aspect of the present disclosure, there is provided wireless charging transmitter circuit, comprising: a controller as described above, and the full-bridge inverter having two full-bridge output nodes. The full-bridge inverter may comprise MOSFETs. The MOSFETs may be co-packaged with the controller of or may be separately packaged. The wireless charging transmitter circuit may further comprise the resonant circuit comprising the series arrangement of the transmitter inductor and the first capacitor, and a second capacitor in parallel with the series arrangement; and a PI-filter comprising first and second filter inductors coupled between first and second terminals of the second capacitor and the first and second full-bridge output nodes respectively.

According to a further aspect of the present disclosure, there is provided a method of operating a wireless charging transmitter having a full-bridge inverter suppling a resonant circuit, which may be a series L-C resonant circuit, with a PI-filter therebetween, the method comprising: controlling the full-bridge to connect an input voltage supply to the PI-filter to supply an excitation pulse to the resonant circuit; controlling the full-bridge inverter to disconnect the input voltage supply and initiate a resonance in the resonant circuit; controlling a switch in the full-bridge inverter to provide an reference ground to a first terminal of the transmitter inductor; and measuring a decay of the voltage at a second terminal of the transmitter inductor.

In one or more embodiments, measuring a decay of the voltage at the second terminal of the transmitter inductor comprises: measuring a first voltage at a central node of a resistive voltage divider coupled between a ground and a supply rail, wherein the central node is coupled to the second terminal of the transmitter inductor by a first coupling capacitor in series with a first coupling resistor.

In one or more embodiments, the wireless charging transmitter has a power transfer mode, and the method further comprises determining a power-loss during operation of the wireless transmitter in the power transfer mode.

In one or more embodiments, determining a power-loss during operation of the wireless charging transmitter in the power transfer mode comprises: measuring a second voltage at a central node of a second resistive voltage divider coupled between the ground and the supply rail, wherein the central node is coupled to the first terminal of the first capacitor by a second coupling capacitor in series with a second coupling resistor.

In one or more embodiments, determining a power-loss during operation of the wireless charging transmitter in the wireless charging comprises measuring a differential voltage between the first voltage and the second voltage.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
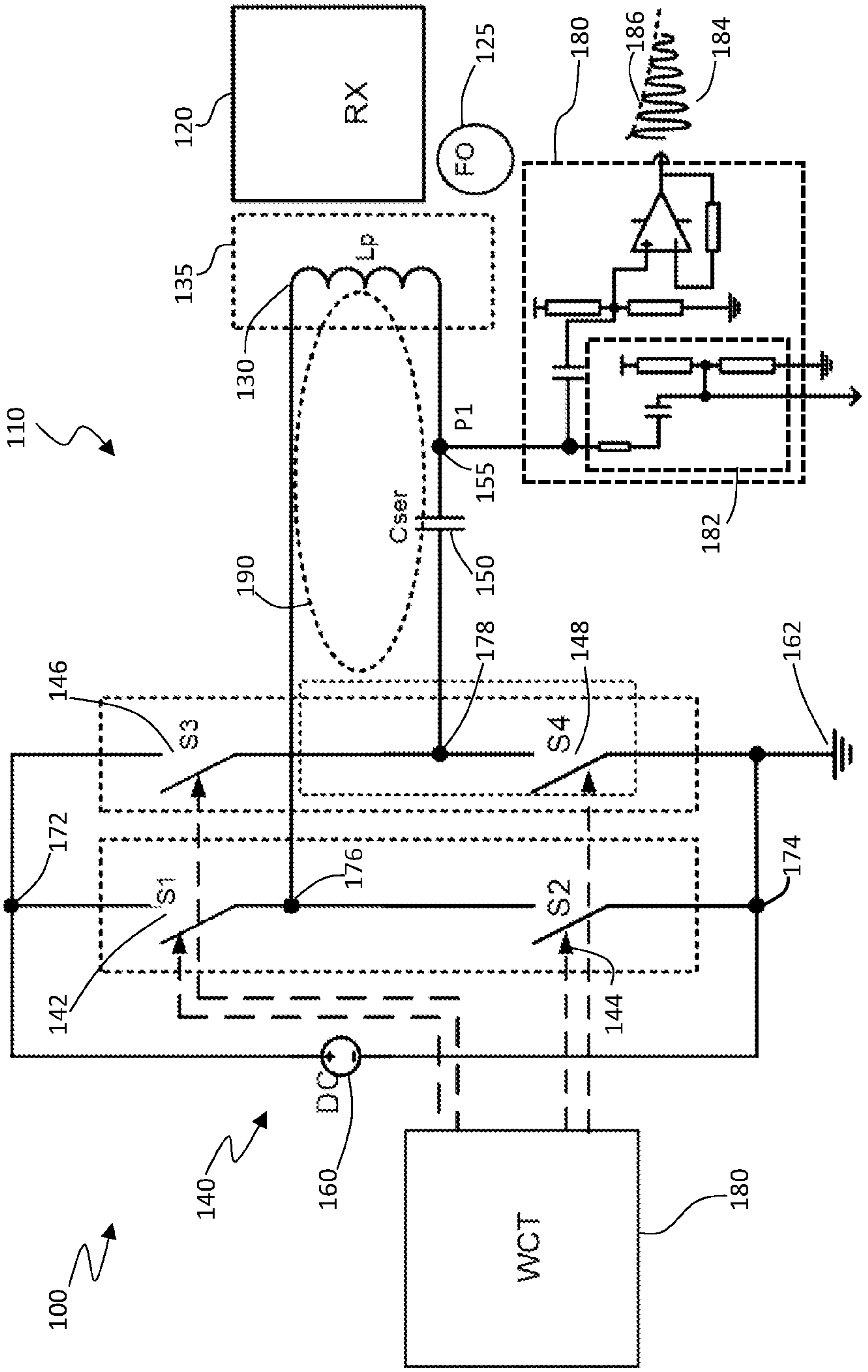
FIG. 1 illustrates a wireless charging system, without a filter between the inverter and the series resonance tank.

It should be noted that the Figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates a wireless charging system 100. The system comprises a transmitter 110 and a receiver RX 120. The transmitter includes a transmitter inductor Lp 130 which may be in or on a charging pad 135. The transmitter inductor 130 is coupled to an inverter 140 by means of a series capacitor Cser 150. The inverter is connected to a DC power supply 160, one terminal of which is connected to a ground 162. The inverter comprises four switches S1 142, S2 144, S3 146 and S4 148 arranged in a full bridge configuration, having two input nodes 172, 174 connected to the DC power supply 160, and two output nodes 176, 178 coupled to the transmitter inductor Lp via series capacitor Cser. The inverter may also thus be described as a full bridge. The switches of the full bridge inverter are controlled by a WCT (or wireless charging Transmitter) controller 180. For effective wireless charging, the receiver RX 120 should be located close to the charging pad 135. The receiver includes a receiving inductor (not shown), and for efficient charging the receiver should have a resonant frequency which is usually lower than (and typically, within 5-10%) the driving frequency of the transmitter. If a foreign object (shown in FIG. 1 as 125) is present close to the charging pad or receiver, the resonant frequency may be affected, which may degrade the charging performance including the efficiency. Furthermore, to reduce losses in the transmitter, the transmitter should resonate with a frequency which is well matched to the drive frequency. The resonant circuit for Q factor detection in this instance, shown at 190, is achieved by closing switches S1 142 and S3 146, and comprises the transmitter inductor Lp and series capacitor Cser. Of course, in other examples, switches S2 144 and S4 148 may be closed instead of S1 142 and S3 146

The voltage Vser (relative to ground 162) may be measured using an RC circuit at a node P1 155 between series capacitor 150 and the transmitter inductor Lp, as shown at 180. The Q-factor of the resonant circuit may be derived, as shown at 186, from the rate of decay of the voltage 184]. Moreover, using an RC circuit connecting node 155 to ground, the coil currents during power transfer may be measured in order to calculate the power loss.

Figure 2:
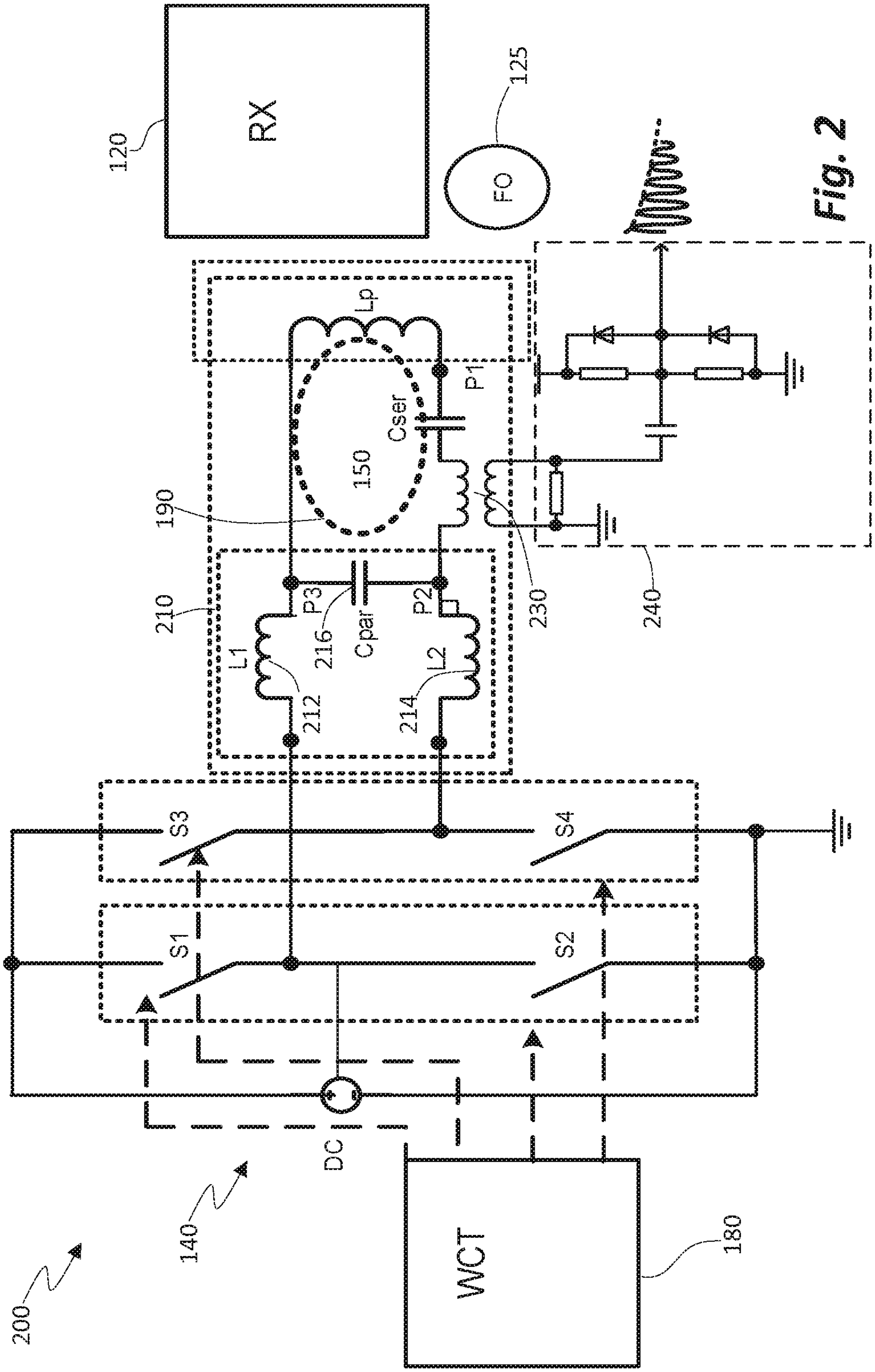
FIG. 2 illustrates a wireless charging system similar to FIG. 1, but including a PI-filter between the inverter and the series resonant tank.

FIG. 2 illustrates an alternative configuration of a wireless charging system 200. The system is generally similar to that shown in FIG. 1 apart from a Pi (or π) filter which is connected between the full bridge inverter and the series resonant circuit. The PI-filter comprises two inductors L1 212 and L2 214, connected one on each leg or terminal of a capacitor Cpar 216. Inductors L1 and L2 may have an inductance in a range of 100 nH to 5 pH, and in particular may in a range of 500 nH to 2 μH. They may have the same or similar values, and they may have a value of 1 μH or approximately 1 μH. The capacitor Cpar may have a value in a range of 100 nF to 5 μF, and more particularly may in a range of 200 nF to 1 μF, or have a value which is equal to or approximately equal to 400 nF. It may, in some embodiments, have an operating voltage of up to 100V, or up 50V. The inductors are connected to respective output nodes 176 and 178 of the full bridge. The capacitor Cpar is connected in parallel with (the series combination of) the series capacitor 150 and transmitter inductor 130.

It will be noted that the resonant circuit 190 of the transmitter coil includes not only the series capacitor 150 and the transmitter inductor 130 but in addition, it includes the parallel capacitor 216. Further, it will be noted that, unlike the resonant circuit 190 in the directly connected transmitter, the resonant circuit in this transmitter which includes a PI-filter is not directly connected to ground at 162, even if switch S4 148 is closed: in other words, the reference voltage may be floating. In consequence, a simple RC divider circuit connection between the series capacitor 150 and ground, in order to determine the voltage at Cser and thence the current in the resonance, may no longer directly be possible. Instead, it has been suggested to use a transformer 230 acting as a current sensor in the loop. The secondary winding of the current sensing transformer 230 can be connected to a coil current sensing circuit 240. The sensed coil current may be also used for Q-factor measurements (during resonance prior to or in between power transfer), as well as in a power loss calculation during wireless charging.

Figure 3:
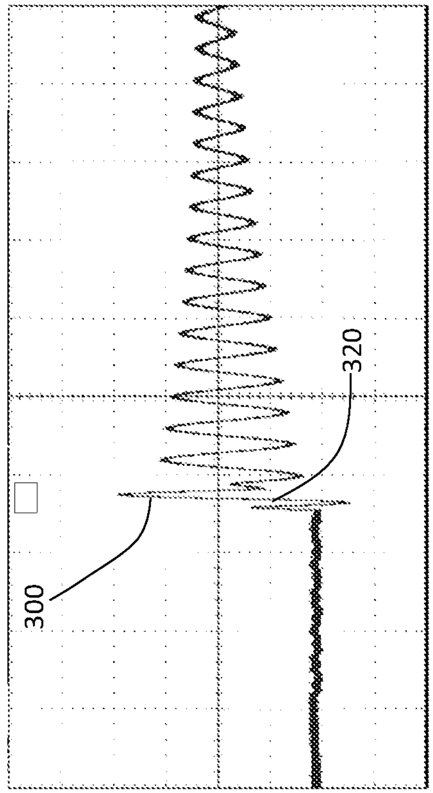
FIG. 3 shows resonance in the transmitter circuit of FIG. 2.

FIG. 3 show the floating resonance signal 300 of normal Q measurement method without a current transformer (CT) for series L-C circuit, in the presence of a complex resonant tank including a PI-filter. In FIG. 3, the resonant signal is a voltage signal measured against time on the x-axis. As can be seen at 320, the signal includes signal distortion, resulting from the fact that the signal is floating.

It is challenging to determine the Q factor, because the signal is floating. An accurate coil current is difficult to obtain, and moreover, it is difficult to obtain the equivalent loop impedance of the complex PI-filter and Cser, since the voltage from one point of Cser-to-GND cannot be easily obtained.

Figure 4:
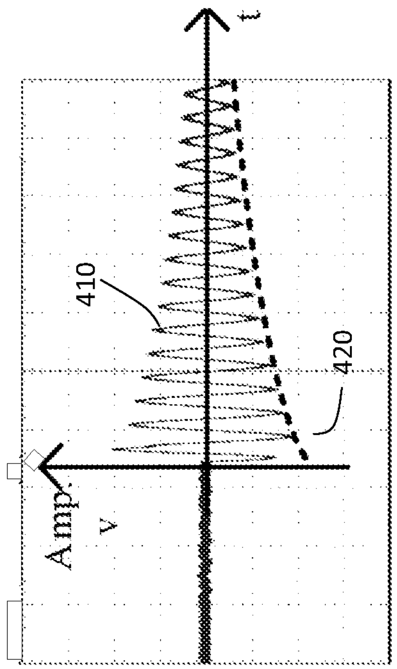
FIG. 4 shows the voltage decay of a resonance circuit.

According to the present disclosure, the switches in the full bridge are dynamically controlled in order to create a desired resonance tank, and this results in a relatively distortion-free resonance. Such a "clean" resonance 410 in the tank is shown in FIG. 4. The decay of the envelope voltage 420 of the resonant tank may be measured. And since the resonant signal is a simple LC circuit, or more exactly an LCC circuit having two capacitors in series, it is straightforward to obtain the Q value of the resonant tank and the coil current from the LC circuit.

Figure 5B:
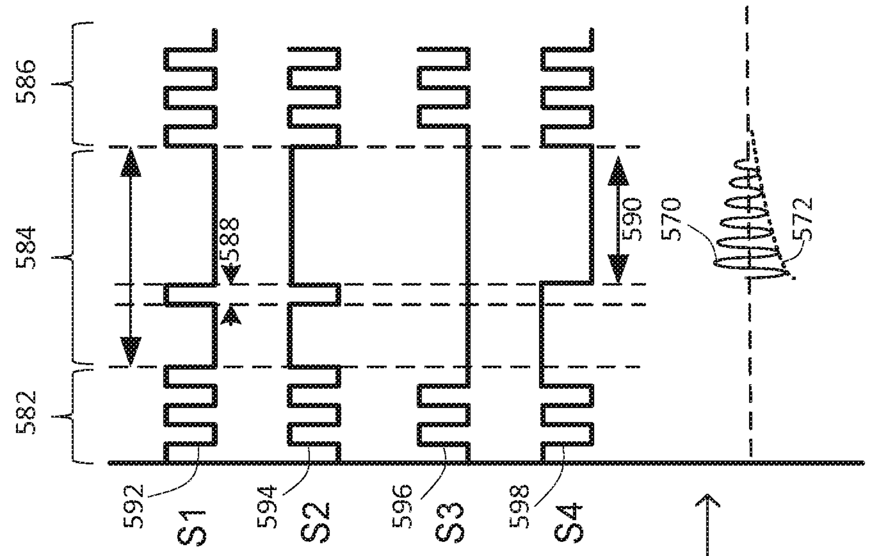
FIG. 5*b* shows control waveforms for the full-bridge inverter of FIG. 5 according to embodiments.
Figure 5A:
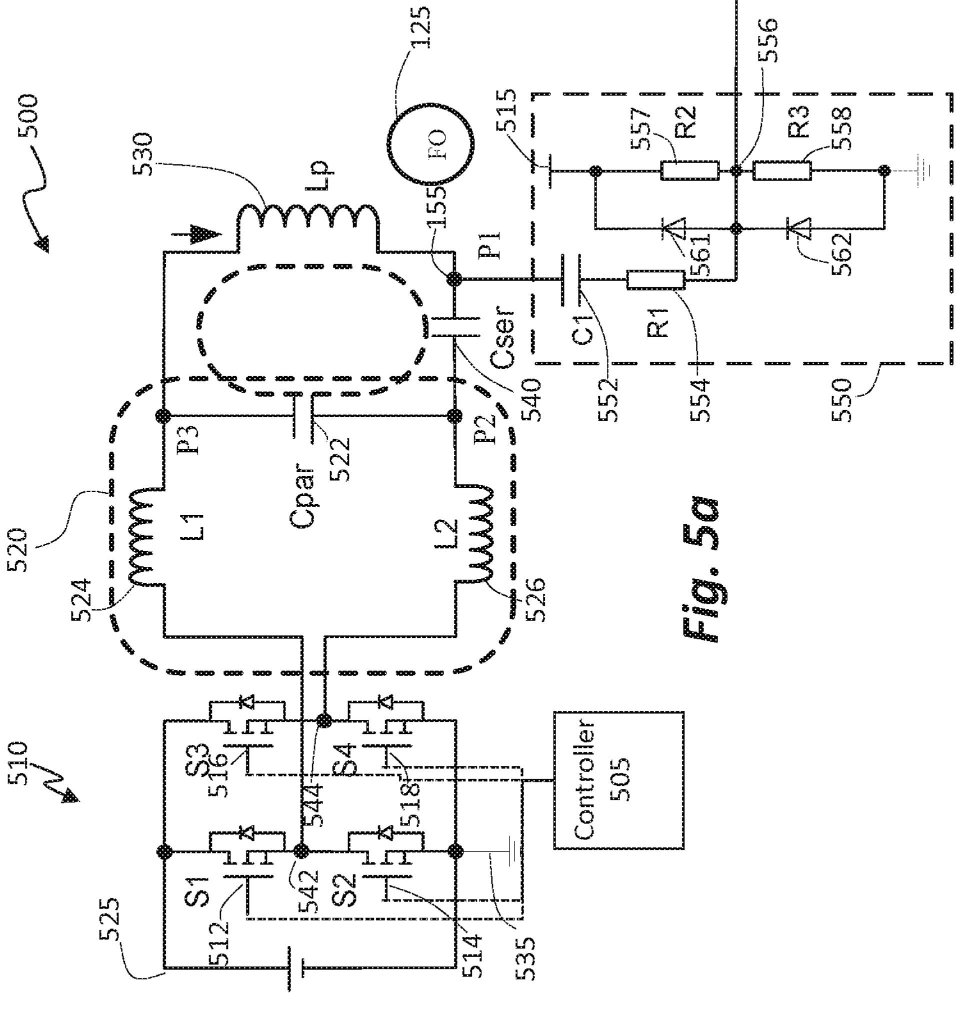
FIG. 5*a* shows a wireless charging transmitter and controller according to embodiments of the present disclosure.

FIG. 5*a* shows a wireless charging system 500 including simple measurement circuits according to embodiments of the present disclosure. The system comprises a controller 505 which controls a full bridge 510, a PI-filter 520, a transmitter inductor Lp 530, which forms a resonant circuit along with series capacitor Cser 540. Parallel capacitor 522 forms the bridge of the PI-filter 520, which also includes inductors L1 524 and L2 526 as its two legs. Measurement circuit 550 comprises an RC divider comprising a series arrangement of capacitor C1 552 and resistor R1 554, which is coupled between the node 155 P1 measurement node 556. The voltage at measurement node 556 is determined by a resistive divider R2 557 and R3 558 between ground and a supply rail 515. Diodes 561 and 562 are connected across each resistor of the resistive divider, to clamp the respective voltage. The measurement circuit 550 may form part of an MCU (microcontroller unit) IP or chip. Typically, the MCU may have a supply voltage of 3.3V, so the supply rail may have voltage 3.3V or 5V, although the skilled person will realise that other voltages may be used for the supply rail 515.

The full bridge may comprise four MOSFETs as shown, —S1 512, S2 514, S3 516, and S4 518. The full bridge connects a DC input supply, shown connected between a supply rail 525 and ground rail 535, in which S1 and S3 selectively connect the supply rail 525 to first and second outputs 542 and 544 respectively, and S2 and S4 selectively connect the ground rail 535 to the first and second output nodes 542 and 544 respectively. The voltage on the supply rail 525 of the DC input supply may typically be 9V or more.

Operation of the circuit of shown in FIG. 5*a*, according to embodiments of the present disclosure, is shown in FIG. 5*b*. FIG. 5*b* shows the on-off state of the switches, which in this non-limited example are implemented as MOSFETs, in full bridge 510, plotted against time in the upper four waveforms, and a resulting decaying resonance 570 in the lowest waveform. Thus 592 depicts the on-off state of switch S1 512 (where a high value indicates that the switches "on" or "closed" and a low value indicates that the switches "off" or "open"). Similarly, 594 depicts the on-off state of switch S2 514, 596 depicts the on-off state of switch S3 514, and 598 depicts the on-off state of switch S4 518.

FIG. 5*b* shows three distinct phases during the operation of the wireless charging system 500. On the left-hand side is depicted, at 582 an example of a wireless charging phase or mode, during which there is a wireless charging transmission; in the central section measurement phase 584 is depicted a measurement of the Q factor during a resonance; and on the right-hand side, at 586, is depicted a second power transfer, or wireless charging, phase.

The power transfer phases shown at 582 and 586 are the same as in conventional operation of a wireless charging circuit. That is to say, switches S2 514 and S3 516 are switched to be in the complimentary states to switches S1 512 and S4 518. The timing of the switching is controlled, according to known methods for instance by PWM control (a 50% duty cycle as shown), in order to result in an AC current being transferred through the PI-filter to the transmitter inductor 530, in order to enable power transfer to the receiver (not shown).

At the start of the resonance measurement phase 584, switches S2 and S4 are switched on and switches S1 and S3 are switched off. Both output nodes 542 and 544 of the half bridge are thus connected directly to the ground rail 535. As shown at 588, a driving, or excitation, pulse is then supplied to the PI-filter in order to prime the resonant circuit. This is done by a closing switch S1 512 and opening S2, to connect the first output node 542 to the supply rail 525. S3 516 and S4 518 are not changed during this pulse since S3 516 is already open and S4 518 closed such that the second output node 544 is connected to ground rail 535.

At the end of the pulse, conventionally all the switches would be opened in order to establish the resonance in the complex circuit comprising the PI-filter and transmitter inductor LP together with series inductors Cser during a subsequent resonance subinterval or phase 590. However, according to embodiments of the present disclosure, switch S2 is returned to an "on" or closed state in order to connect the resonant circuit to ground, since by closing S2 514, the first output node 542 is directly connected to ground. The skilled person will appreciate that the present disclosure is not limited to closing S2; in other embodiments S4 may, instead, be closed such that the second output node is grounded during the remainder of the resonance phase. In still other embodiments, one of S1 512 and S3 516 is closed in order to connect first or second output node 542 or 544 respectively to an alternative fixed voltage (in this case the DC voltage at the supply rail 525). In general, it will be appreciated that during the resonance time 590, one and only one of the switches is closed, in order to fix a voltage at one point of the resonant circuit. In other words, during the resonance measurement subinterval or phase 590, the controller controls a switch in the full-bridge inverter to provide an reference ground to a first terminal of the transmitter inductor. The reference ground may also be referred to as an AC ground, since the ground connection is through one inductive leg of the PI filter. The fixed voltage at one of the output nodes of the full bridge constitutes an reference ground to a first one terminal of the transmitter inductor, since at the resonance frequency, the PI-filter inductors L1 524 and L2 526 provide a low impedance path between the transmitter inductor and the fixed voltage point. The fixed voltage point may, as already mentioned, typically be a ground reference or a supply rail reference.

During the resonance time 590, since only one of the output node 542 and 544 are connected to a fixed DC voltage (either ground 535 or the supply voltage at the supply rail 525), there is only a simple resonance circuit comprising the transmitter inductor 530, the series capacitor Cser 540, and the parallel capacitor Cpar 522. The inductors L1 524 and L2 526 in the legs of the PI-filter do not form part of the resonance. In consequence, as shown in the bottom waveform 570 of FIG. 5*b*, during the resonant time 590, a "clean" resonance occurs. The voltage envelope 572 of the resonance may then be used to determine the Q factor of the circuit.

Figures 6A, 6B:
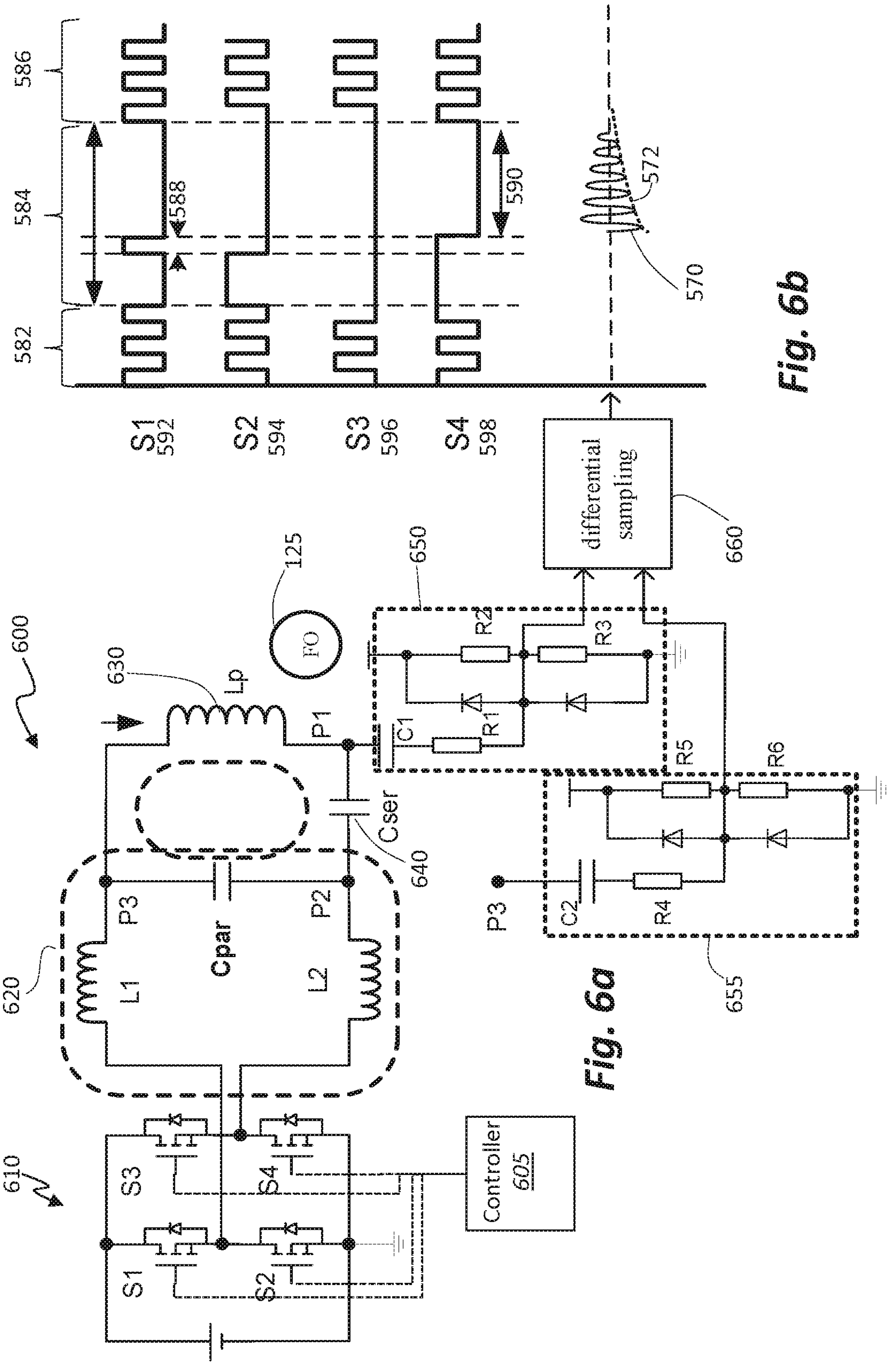
FIG. 6*a* shows a wireless charging transmitter and controller according to other embodiments of the present disclosure.
FIG. 6*b* shows control waveforms for the full-bridge inverter of FIG. 6 according to embodiments.

FIG. 6*a* shows a wireless charging system 600 including simple measurement circuits according to other embodiments of the present disclosure. Similar to FIG. 5*a*, the system comprises a controller 605 which controls a full bridge 610, a PI-filter 620, a transmitter inductor Lp 630, which forms a resonant circuit along with series capacitor Cser 640. Measurement circuit 650 is similar to measurement circuit 550, however, in the embodiment shown in FIG. 6, there is included a further measurement circuit 655, which is similar to measurement circuit 650, but is tied to a different node P3, which in this example is at the other terminal of the transmitter inductor Lp 630 Outputs from both measurement circuits 650 and 655 are combined in a differential sampling unit 660. The differential sampling unit 660 may be a discrete module. In other embodiments, the differential sampling unit functionality may be integrated into an MCU.

Operation of the circuit of shown in FIG. 6*a*, according to embodiments of the present disclosure, is similar to that shown in FIGS. 5*a* and 5*b*, and is shown in FIG. 6*b*. The figure thus shows, at 592, 594, 596 and 598 the on-off state of the switches S1, S2, S3 and S4 in full bridge 510, plotted against time in the upper four waveforms. And in particular the switch states during phases or intervals 582, 586, and 584 including the excitation pulse 588 and decay interval 590 resulting in the decaying resonance 570.

Figures 7, 8:
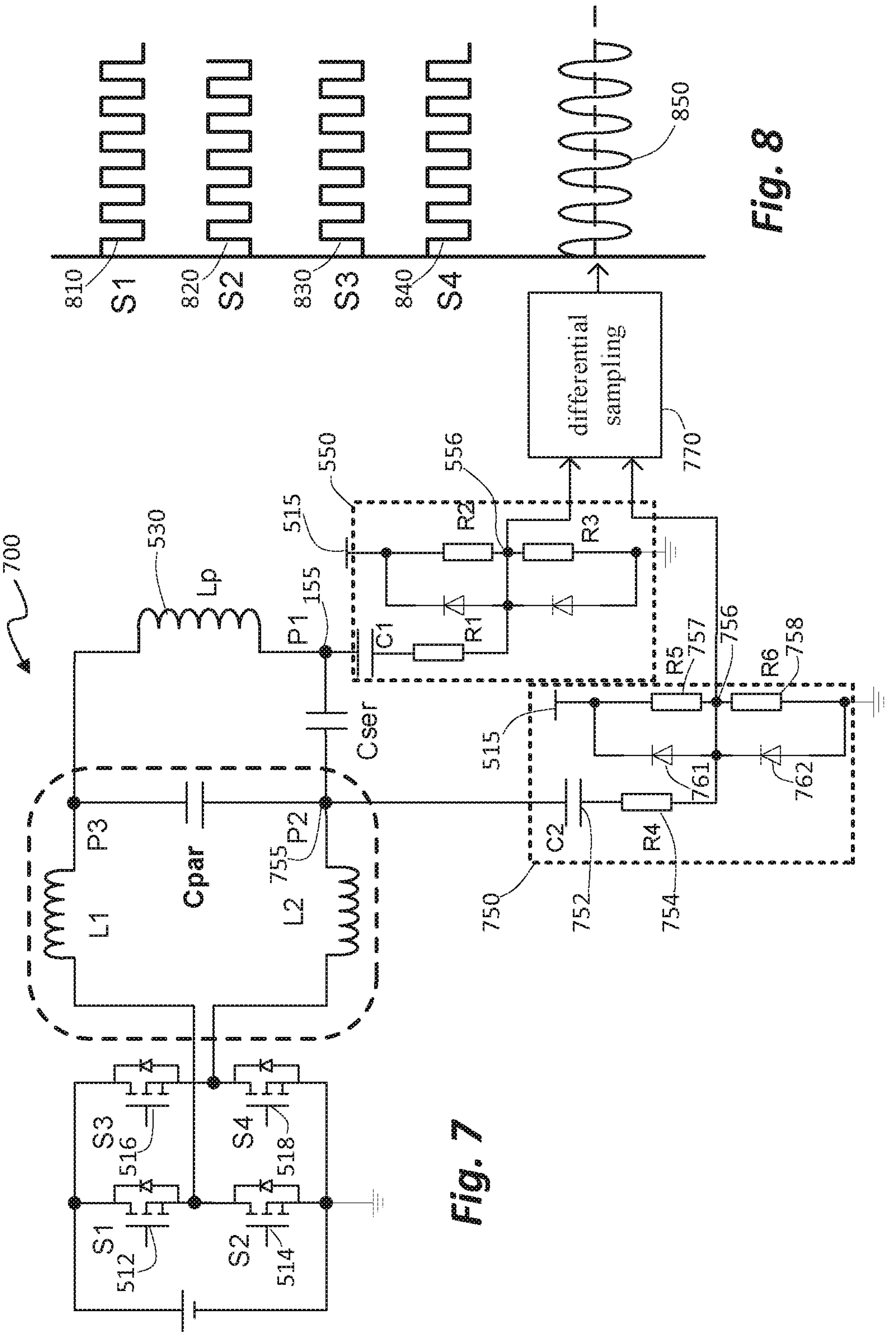
FIG. 7 shows a wireless charging transmitter and controller according to other embodiments.
FIG. 8 shows control waveforms for the full-bridge inverter of FIG. 7 according to embodiments.

FIG. 7 shows a wireless charging system 700 including simple measurement circuits according to other embodiments of the present disclosure. This circuit is similar to that shown in FIG. 5 except that it includes a second measurement circuit 770 connected to a node P2 755 between the series capacitor Cser and the PI-filter. In the wireless charging system 700, the controller 505 is not shown, for clarity. The second measurement circuit 750 is similar to measurement circuit 550. Second measurement circuit 750 comprises an RC divider comprising a series arrangement of capacitor C2 752 and resistor R4 754, which is coupled to second measurement node 756. The voltage at second measurement node 756 is determined by a resistive divider R5 757 and R6 758 between ground and the supply rail 515. (Diodes 761 and 762 are connected across each resistor of the resistive divider. In this embodiment, measurement node 556 and measurement node 756 are supplied as a differential signal to a differential sampling unit 770. Similar to the embodiments described with reference to FIG. 6, The differential sampling unit 770 may be a discrete module, or its functionality may be integrated into an MCU.

Operation of the circuit of FIG. 7 during wireless charging is shown in FIG. 8. It will be appreciated that operation during a resonance measurement phase to determine the Q-factor may be the same as for the embodiment shown in FIG. 5, in which the first measurement circuit 550 is used. During the power transfer phase, similar to phases 582 and 586 shown in FIG. 6, switches S2 514 and S3 516 are switched to be in the complimentary states to switches S1 512 and S4 518, as shown in the switch timing diagrams 810, 820, 830 840. The timing of the switching is controlled, according to known methods for instance by PWM control (a 50% duty cycle as shown), in order to result in an AC current being transferred through the PI-filter to the transmitter inductor 530, in order to enable power transfer to the receiver (not shown). The lowermost waveform 850 of FIG. 8 shows the voltage across the series capacitor, which can be readily determined by the differential sampling unit 770.

Figure 9:
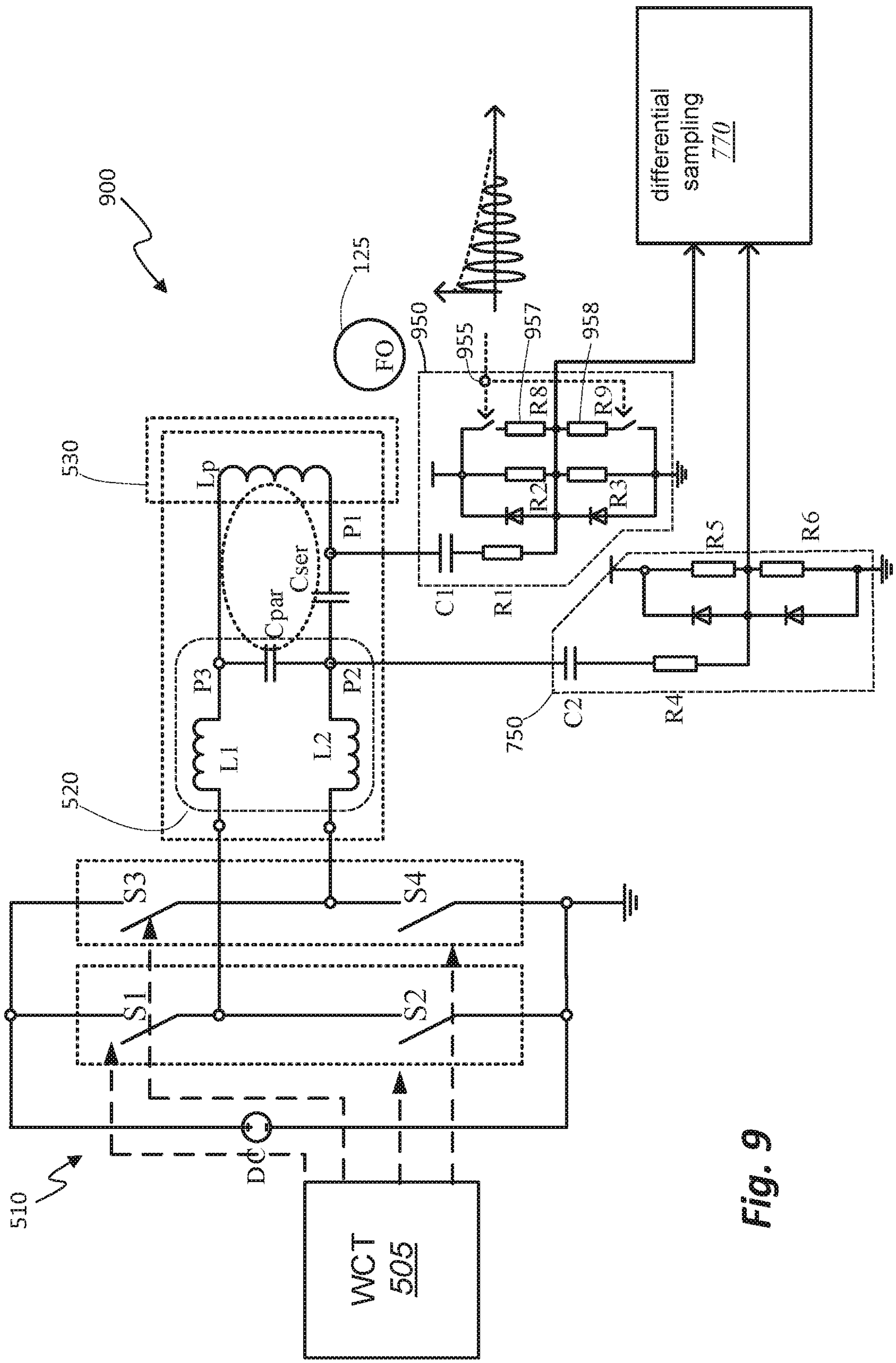
FIG. 9 shows a wireless charging transmitter and controller according to other embodiments.

FIG. 9 shows a wireless charging system 900 according to other embodiments, in which a controller 505 controls the full bridge 510 which supplies a current to the transmitter inductor 530 via a PI-filter 520. This embodiment includes two measurement circuits, being a first measurement circuit 950 and a second measurement circuit 750. The second measurement circuit 750 is the same as that shown in FIG. 7. The first measurement circuit is similar to the measurement circuit 550 shown in FIG. 5, except that it has a further resistive divider comprising two resistors R8 957 and R9 958 which are selectively coupled connectable, by means of a switch 955, in parallel with the resistive divider R2/R3. This resistive divider is connected in order to determine the Q-factor, by measuring the decay of the free resonance waveform, as discussed above with regard to FIG. 6: that is to say, during phases 582 and 586, the swith 955 is closed to get a divider resistance, similar to that 750. However, during the phase 584 the switch 955 is opened, so only R2 and R3 are used, resulting in the resonance signal during Q-measurement phase.

From reading the present disclosure, other variations and modifications will be apparent to the skilled person. Such variations and modifications may involve equivalent and other features which are already known in the art of wireless charging and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

LIST OF REFERENCE SIGNS

100 wireless charging system
110 transmitter
120 receiver Rx
130 transmitter inductor LP
135 charging pad
140 inverter
142, 144, 146, 148 switches S1, S2, S3, S4
150 series capacitor Cser
155 node P1
160 DC power supply
162 ground
172, 174 input node
176, 178 output node
180 WCT controller
190 Resonant circuit
200 wireless charging system
212, 214 inductor L1, L2
216 parallel capacitor Cpar
230 transformer
240 current sensing circuit
300 floating resonance signal
320 signal distortion in resonance
410 resonance
420 decay envelope voltage
500 wireless charging system
505 controller
510 full-bridge inverter
512, 514, 516, 518 MOSFET S1, S2, S3, S4
515 supply rail of DC supply
520 PI-filter
525 supply rail for measurement circuit
524, 526 PI-filter inductor L1, L2
522 parallel capacitor Cpar
525 supply rail
530 transmitter inductor LP
535 ground rail
540 series capacitor Cser
542 first output node
544 second output node
550 measurement circuit
552 capacitor C1
554 resistor R1
556 measurement node
557 resistive divider resistor R2
558 resistive divider resistor R3
561, 562 diode
570 resonance
572 voltage envelope
582, 586 power transfer phase
584 resonance measurement phase
588 excitation pulse
590 resonance time
700 wireless charging system
750 second measurement circuit
752 capacitor C2
754 resistor R4
755 node P2
756 second measurement node
757 resistive divider resistor R5
758 resistive divider resistor R6
770 differential sampling unit
810, 820, 830, 840 switch timing diagram of S1, S2, S3, S4
850 voltage across series capacitor
900 wireless charging system
950 first measurement circuit
957, 958 resistive divider resistor R8, R9

The invention claimed is:

1. A controller for: a wireless charging transmitter circuit having a full-bridge inverter having first and second full-bridge output nodes, a resonance circuit comprising a series arrangement of a transmitter inductor and a first capacitor, and a second capacitor in parallel with the series arrangement, the wireless charging transmitter circuit further including a PI-filter comprising the second capacitor and first and second filter inductors coupled between first and second terminals of the second capacitor and the first and second full-bridge output nodes respectively;

wherein the controller is operable to measure a Q-factor of the resonant circuit by:

controlling the full-bridge inverter to connect an input voltage supply to the PI-filter to supply an excitation pulse to the resonant circuit;

controlling the full-bridge inverter to disconnect the input voltage supply and initiate a resonance in the resonant circuit;

controlling a switch in the full-bridge inverter to provide an reference ground to a first terminal of the transmitter inductor; and measuring a decay of a voltage in the resonance circuit at a second terminal of the transmitter inductor, wherein the measuring comprises measuring a first voltage at a central node of a resistive voltage divider coupled between a ground and a supply rail, the central node being coupled to the second terminal of the transmitter inductor by a first coupling capacitor in series with a first coupling resistor.

2. The controller according to claim 1, further operable to determine a power-loss during wireless charging.

3. The controller according to claim 2, wherein determining a power-loss during wireless charging comprises measuring a second voltage at a central node of a second resistive voltage divider coupled between the ground and the supply rail, the central node being coupled to the first terminal of the first capacitor by a second coupling capacitor in series with a second coupling resistor.

4. A controller for: a wireless charging transmitter circuit having a full-bridge inverter having first and second full-bridge output nodes, a resonance circuit comprising a series arrangement of a transmitter inductor and a first capacitor, and a second capacitor in parallel with the series arrangement, the wireless charging transmitter circuit further including a PI-filter comprising the second capacitor and first and second filter inductors coupled between first and second terminals of the second capacitor and the first and second full-bridge output nodes respectively;

wherein the controller is operable to measure a Q-factor of the resonant circuit by:

controlling the full-bridge inverter to connect an input voltage supply to the PI-filter to supply an excitation pulse to the resonant circuit;

controlling the full-bridge inverter to disconnect the input voltage supply and initiate a resonance in the resonant circuit;

controlling a switch in the full-bridge inverter to provide an reference ground to a first terminal of the transmitter inductor; and measuring a decay of a voltage in the resonance circuit, wherein the measuring comprises measuring a differential voltage between two nodes of the resonance circuit, wherein the two nodes are the first and second terminals of the transmitter inductor, and wherein determining a power-loss during wireless charging comprising measuring a differential voltage between a first voltage and a second voltage, wherein the first voltage is a voltage at a central node of a resistive voltage divider coupled between a ground and a supply rail, the central node being coupled to a second terminal of the transmitter inductor by a first coupling capacitor in series with a first coupling resistor, and wherein the second voltage is a voltage at a central node of a second resistive voltage divider coupled between the ground and the supply rail, the central node being coupled to the first terminal of the first capacitor by a second coupling capacitor in series with a second coupling resistor.

5. The controller according to claim 4, wherein determining a power-loss during wireless charging comprises determining a current through the transmitter inductor from the differential voltage between the first voltage and the second voltage.

6. A wireless charging transmitter circuit, comprising:

a full-bridge inverter having first and second cull-bridge output nodes;

a resonance circuit comprising a series arrangement of a transmitter inductor and a first capacitor, and a second capacitor in parallel with the series arrangement;

a PI-filter comprising the second capacitor and first and second filter inductors coupled between first and second terminals of the second conductor and the first and second full-bridge output nodes respectively; and a controller operable to measure a Q-factor of the resonant circuit by:

controlling the full-bridge inverter to connect an input voltage supply to the PI-filter to supply an excitation pulse to the resonant circuit;

controlling the full-bridge inverter to disconnect the input voltage supply and initiate a resonance in the resonant circuit;

controlling a switch in the full-bridge inverter to provide an reference ground to a first terminal of the transmitter inductor; and measuring a decay of a voltage in the resonance circuit.

7. The wireless charging transmitter circuit of claim 6, wherein the full-bridge inverter comprises a plurality of MOSFETs which are co-packaged with the controller.

8. The wireless charging transmitter circuit of claim 6, further comprising a second resistive voltage divider, a second coupling capacitor and a second coupling resistor.

9. A method of operating a wireless charging transmitter having a full-bridge inverter supplying a resonant circuit with a PI-filter therebetween, the method comprising:

controlling the full-bridge to connect an input voltage supply to the PI-filter to supply an excitation pulse to the resonant circuit;

controlling the full-bridge inverter to disconnect the input voltage supply and initiate a resonance in the resonant circuit;

controlling a switch in the full-bridge inverter to provide a reference ground to a first terminal of the transmitter inductor; and measuring a decay of the voltage at a second terminal of the transmitter inductor, wherein the measuring comprises measuring a first voltage at a central node of a resistive voltage divider coupled between a ground and a supply rail, wherein the central node is coupled to the second terminal of the transmitter inductor by a first coupling capacitor in series with a first coupling resistor.

10. The method of claim 9, wherein the wireless charging transmitter has a power transfer mode, and the method further comprises determining a power-loss during operation of the wireless transmitter in the power transfer mode.

11. The method of claim 10, wherein determining a power-loss during operation of the wireless charging transmitter in the power transfer mode comprises:

measuring a second voltage at a central node of a second resistive voltage divider coupled between the ground and the supply rail, wherein the central node is coupled to the first terminal of the first capacitor by a second coupling capacitor in series with a second coupling resistor.

12. The method of claim 11, wherein determining a power-loss during operation of the wireless charging transmitter in the power transfer mode comprises measuring a differential voltage between the first voltage and the second voltage.

13. A controller for: a wireless charging transmitter circuit having a full-bridge inverter having first and second full-bridge output nodes, a resonance circuit comprising a series arrangement of a transmitter inductor and a first capacitor, and a second capacitor in parallel with the series arrangement, the wireless charging transmitter circuit further including a PI-filter comprising the second capacitor and first and second filter inductors coupled between first and second terminals of the second capacitor and the first and second full-bridge output nodes respectively;

wherein the controller is operable to measure a Q-factor of the resonant circuit by:

controlling the full-bridge inverter to connect an input voltage supply to the PI-filter to supply an excitation pulse to the resonant circuit;

controlling the full-bridge inverter to disconnect the input voltage supply and initiate a resonance in the resonant circuit;

controlling a switch in the full-bridge inverter to provide an reference ground to a first terminal of the transmitter inductor; and measuring a decay of a voltage in the resonance circuit, wherein the controller is further operable to determine a current in the transmitter inductor by measuring a second voltage at a central node of a second resistive voltage divider coupled between the ground and a supply rail, the central node being coupled to the first terminal of the first capacitor by a second coupling capacitor in series with a second coupling resistor.

* * * * *